Figure 1:
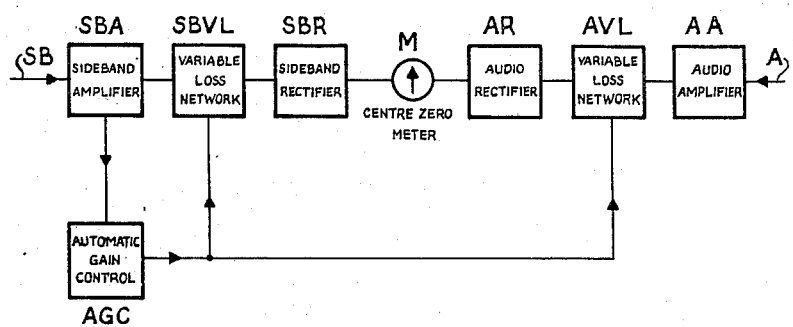

Patented Sept. 26, 1950

2,523,456

UNITED STATES PATENT OFFICE 2,523,456

INDICATING ARRANGEMENT

Teseo Bruno Dante Terroni and James Rowan Cannon, Liverpool, England, assignors to Automatic Telephone & Electric Company Limited, Liverpool, England, a British company Application May 12, 1947, Serial No. 747,424
In Great Britain May 21, 1946

10 Claims. (Cl. 332—39)

The present invention relates to indicating arrangements and is more particularly concerned with arrangements for determining the gain/frequency characteristics of equipment employed in a carrier current transmission system and of the system itself.

The gain/frequency characteristic is usually measured by making a comparison between an audio frequency signal and the corresponding sideband frequency signal. For example, in determining the characteristic of the equipment at the outgoing end of a carrier channel, the output from an audio frequency test oscillator of variable frequency is fed into the equipment and the voltage or current ratio of the sideband frequency output of the equipment to audio frequency input is determined for a suitable number of frequencies. Similarly in testing the equipment at the incoming end of the channel, the ratio between the sideband frequency input and audio frequency output of the equipment is obtained for a number of frequencies. In both cases the gain will be expressed in decibels.

It will be appreciated that this method of determining the characteristic involving as it does the measurement of two quantities at each frequency and determining their ratio is a very laborious one. Further to ensure a reasonable accurate result it is necessary to keep a constant check on the output level of the test oscillator.

It is one of the objects of the present invention to provide an arrangement by which the gain/frequency characteristic may be rapidly determined by direct meter readings and in which it is not necessary for the output level of the test oscillator to remain substantially constant.

According, therefore, to one feature of the invention, a centre zero instrument is employed for comparing an audio frequency signal with the corresponding sideband frequency signal and means are provided for maintaining the level of one of the signals substantially constant and introducing a corresponding change in the level of the other signal to enable the instrument to be calibrated in decibels.

According to a further feature of the invention, a D. C. voltage derived from an audio frequency signal is compared with a D. C. voltage derived from the corresponding sideband frequency signal, one of said voltages being maintained at a substantially constant level while a corresponding change is made in the level of the other voltage whereby the difference between the two voltages as measured on a centre zero instrument gives a direct indication of the gain at that frequency.

According to another feature of the invention, the amplitude of an audio frequency signal the frequency of which is continuously variable is compared with the corresponding sideband frequency signal and the level of one signal is maintained substantially constant while a corresponding change is introduced in the level of the other signal by means of an automatic gain control circuit, the comparison being effected by a centre zero instrument to enable a rapid determination to be obtained of the change in gain over the range of frequencies.

With the arrangement of the invention the centre zero meter may be calibrated in db gain and loss over the narrow range corresponding to specification requirements and a comparatively large deflection may be obtained for a fractional db increment. For production testing the meter scale may be marked with the zero position and the permissible upper and lower limits, so that as the test oscillator is swung over the frequency range, e. g. 300–2800 C. P. S., the meter will indicate immediately whether the response is within the limits.

Referring first to Fig. 1 which shows schematically one embodiment of the invention, the audio frequency from the test oscillator or from the incoming signal is applied to the equipment under test and to the point A. The sideband output from the equipment or the line is applied to the point SB. The two inputs are fed to buffer amplifiers, AA and SBA respectively, which eliminate the possibility of coupling between the two circuits. The outputs from these amplifiers are fed through variable loss networks, AVL and SBVL, to the appropriate rectifier circuits, AR and SBR, which produce D. C. voltages proportional to the input A. C. voltages. The difference between the two D. C. voltages is indicated by the centre zero D. C. meter M. Since the deflection obtained depends upon the actual difference between the two input voltages, while the meter is calibrated in decibels, it is necessary to ensure that one of the voltages to be compared should be maintained at a constant level at the meter rectifier point independent of fluctuations in the output level of the test oscillator, and such gain adjustments as are necessary to keep this constant shall be applied in equal amount to the other voltage. This is achieved by the A. G. C. arrangement which functions as follows.

The variable loss networks AVL and SBVL have identical characteristics, which may be controlled by a direct current derived from one of the input voltages (shown in Fig. 1 as the sideband voltage SB). When the A. C. input to the A. G. C. circuit increases by 1 db a loss of 1 db. is introduced in the two variable loss networks. By this means, the magnitude of the signal which is applied to the sideband rectifier circuit is held constant independent of the variation of the sideband itself, while the ratio between the two D. C. voltages produced by the rectifiers is the same as the ratio of the two A. C. input voltages since the same loss in db has been introduced into each circuit.

Figure 2:
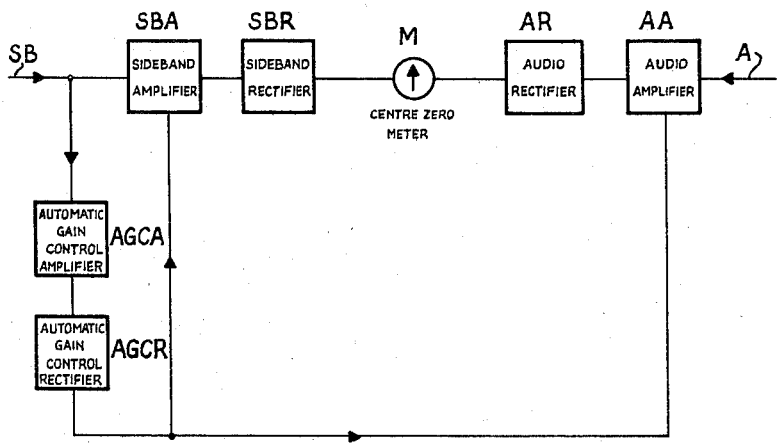
Figure 3:
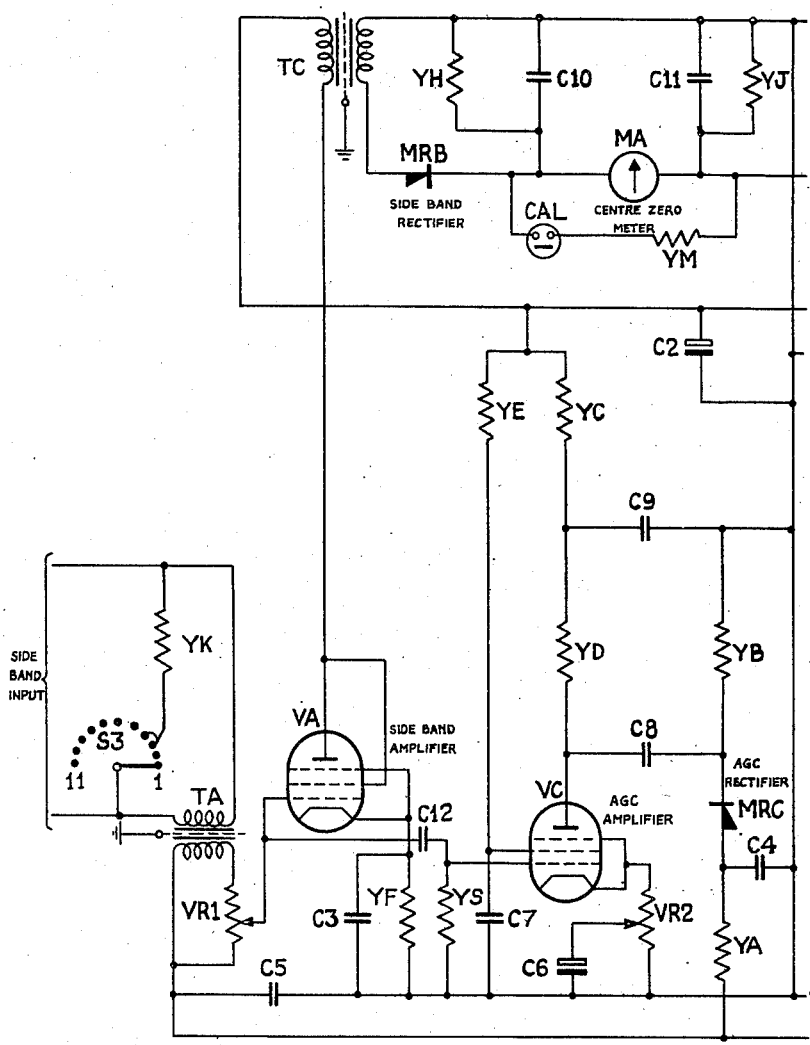
Figure 4:
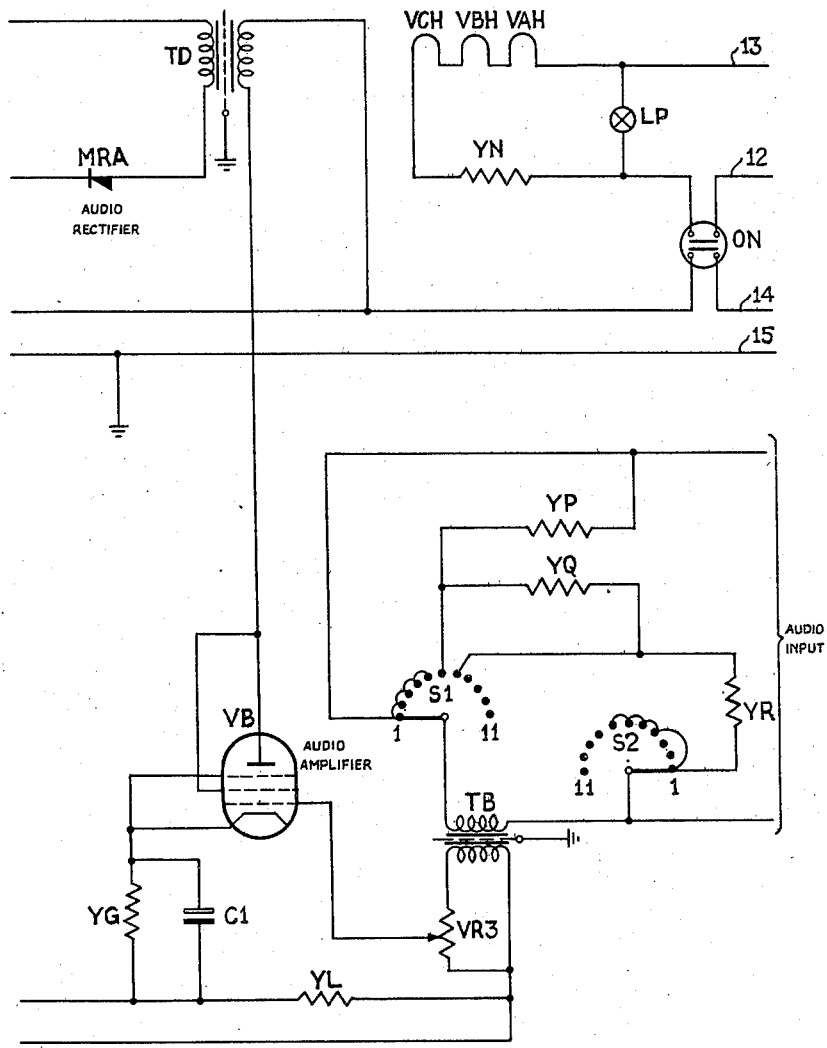

A simplified adaptation of the scheme is shown schematically in Fig. 2, and as a detailed circuit in Fig. 3 and Fig. 4. The references used in Fig. 2 have the same significance as the similar references in Fig. 1. In the arrangement of Fig. 2 instead of having separate variable loss networks, the A. G. C. circuit AGCA applies a bias via the rectifier AGCR to the two buffer amplifiers in such a way as to realize approximately the conditions outlined above.

The circuit is shown in detail in Figs. 3 and 4 and operates as follows. Positive and negative H. T. voltages are connected to leads 14 and 15 respectively, and the positive and negative heater voltages are applied to leads 12 and 13, the operation of the switch ON serving to condition the valves for operation.

The sideband frequency SB is applied to the grid of the variable mu valve VA through the input transformer TA and the gain control variable resistance VR1. The amplified signal appears across transformer TC and the A. C. voltage across the secondary of the transformer is rectified by MRB to produce a steady D. C. voltage across the smoothing condenser C10.

Similarly, the audio frequency A is applied to the grid of the valve VB through the input transformer TB and the gain control variable resistance VR3. The signal in the anode circuit is fed through transformer TD and rectified by MRA so that a steady D. C. voltage appears across condenser C11.

From the foregoing description it can be seen that the deflection of the sensitive meter MA depends on the difference between the D. C. potentials which in turn depend on the input signal voltages.

Referring now to the A. G. C. circuits, the signal which appears at the control grid of VA is also fed through the D. C. blocking condenser C12 to the control grid of the A. G. C. valve VO which amplifies the signal, resistance YC and condenser C9 being provided for decoupling purposes. The amplified signal voltage, which appears across the anode load resistance YD is fed through the blocking condenser C8 and is rectified by MRC, the D. C. circuit for the rectifier MRC being completed through resistance YB. The rectified signal is smothed by condenser C4, resistance YA and condenser C5 so that a steady negative potential appears at the lower end of resistance YA which is fed back to the control grid circuit of the valves VA and VB as negative bias.

To calibrate the instrument prior to making any measurments, the calibration switch CAL is operated to connect the shunt YM across the meter MA, and the audio signal (but not the sideband) is connected. The gain of the valve VB is then adjusted by VR3 until the meter MA reads to a pre-determined calibrating mark. The sideband of reference frequency is now connected and the switch CAL restored to remove the shunt from the meter MA which is now made to read zero by controlling the gain of valve VA at resistor VR1.

In order to calibrate the specified test limits on the meter M the above line-up procedure to set zero is performed with the manually operated selector switch S having its wipers on step 6. This connects the primary of transformer TB across resistors YR and YQ which are in series with YP. The switch is now set on steps 5 and 7 in turn and on the former the audio input is thereby increased, and on the latter it is decreased as determined by the values of the potentiometer YP, YQ and YR which, for example, may be 52, 48 and 500 ohms respectively, to give a range of $+0.9$ db. Any adjustment required is made at the control VR2.

The selector switch S is also used to provide either a 600 ohm or high impedance terminations at the SB or A inputs. Switch position 1 terminates the sideband input with high impedance (primary winding of TA) and the audio with 600 ohms (YP, YQ and YR in series). In position 2, the sideband and audio are both terminated on the high impedance transformer primaries. In position 3, the sideband terminates on 600 ohms and the audio on high impedance while in position 4, both sideband and audio terminate on 600 ohms. The choice of the terminations depends on the point in the carrier system to which the sideband-audio meter is connected. For example, in taking transmit (audio to sideband) readings, the test oscillator and the input to the carrier system (the hybrid) each terminate on 600 ohms, the standard termination for all carrier equipments, so that the audio terminal of the meter which bridges the leads from the oscillator to the hybrid must connect to high impedance at the meter. On the other hand, taking receive (sideband to audio) readings the received audio is connected from the 600 ohms termination at the hybrid to the 600 ohms at the audio terminals of the sideband-audio meter.

We claim:

1. An indicating arrangement for determining by direct reading the gain/frequency characteristics in decibels of carrier current equipment by comparing an audio frequency signal with the corresponding sideband frequency signal comprising a rectifier for the audio frequency signal and for the sideband frequency signal, a centre zero indicating instrument, means for applying the output from each rectifier to said indicating instrument for comparing said two frequencies and means for maintaining the level of one of the signals substantially constant and for introducing a corresponding change in the amplitude of the other signal to enable the instrument to be calibrated in decibels.

2. An indicating arrangement for determining by direct reading the gain/frequency characteristics in decibels of carrier current equipment by comparing an audio frequency signal with the corresponding sideband frequency signal comprising means for deriving a first direct voltage from said audio frequency signal, means for deriving a second direct voltage from said sideband frequency signal, a centre zero instrument for comparing said two direct voltages and means for maintaining one of said voltages at a substantially constant amplitude while a corresponding change is made in the amplitude of the other voltage whereby the difference between the two voltages as measured by said centre zero instrument gives a direct indication of the gain at the audio frequency.

3. An indicating arrangement for determining by direct reading the gain/frequency characteristics in decibels of carrier current equipment by comparing a variable-frequency audio signal with the corresponding sideband frequency signal comprising a first signal path for said audio frequency signal, a second signal path for said sideband frequency signal, an automatic gain control circuit associated with one of said paths for maintaining substantially constant the level of the signal in one path and for effecting a corresponding change in the level of the signal in the other path, rectifying means in each path, a centre zero indicating instrument and means for applying said rectified signals in opposition to said indicating instrument whereby a rapid determination is obtained of the change in gain of the equipment over a range of audio frequencies.

4. An indicating arrangement as claimed in claim 3 wherein each said signal path includes a variable loss circuit to which a control voltage is applied from said automatic gain control circuit.

5. An indicating arrangement as claimed in claim 3 wherein each said signal path includes an amplifier, the gain of which is varied by a control voltage from said automatic gain control circuit.

6. An indicating arrangement for determining the gain/frequency characteristics of carrier current equipment by comparing a variable-frequency audio signal with the corresponding sideband frequency signal comprising a first signal path for said audio frequency signal, a second signal path for said sideband frequency signal, an amplifier in each of said paths, an automatic gain control circuit associated with one of said paths, means for deriving a direct voltage from said automatic gain control circuit and for applying said direct voltage as bias to each of said amplifiers so that the level of the signals in one of said paths remains substantially constant and a corresponding change is made in the level of the signals in the other path, rectifying means in each path, a centre zero indicating instrument and means for applying said rectified signals in opposition to said indicating instrument whereby a rapid determination is obtained of the change in gain of the equipment over a range of audio frequencies.

7. An indicating arrangement for determining the gain/frequency characteristics of carrier current equipment by comparing a variable-frequency audio signal with the corresponding sideband frequency signal comprising a first signal path for said audio frequency signal, a second signal path for said sideband frequency signal, an automatic gain control circuit associated with one of said paths for maintaining substantially constant the level of the signal in said one path and for effecting a corresponding change in the level of the signal in the other path, rectifying means in each path, a centre zero indicating instrument, means for applying said rectified signals in opposition to said indicating instrument, a resistor and switching means for connecting said resistor across said centre zero indicating instrument for calibration purposes.

8. An indicating arrangement for determining the gain/frequency characteristics of carrier current equipment by comparing a variable-frequency audio signal with the corresponding sideband frequency signal comprising a first signal path for said audio frequency signal, a second signal path for said sideband frequency signal, an automatic gain control circuit associated with one of said paths for maintaining substantially constant the level of the signal in said one path and for effecting a corresponding change in the level of the signal in the other path, rectifying means in each path, a centre zero indicating instrument, means for applying said rectified signals in opposition to said indicating instrument, a multi-position switching device in each path which in certain positions varies the terminating impedances at said paths and which in other positions enables the arrangement to be calibrated for operation between predetermined upper and lower limits.

9. An indicating arrangement as claimed in claim 8 wherein said signal paths both include a transformer and one level of said switching device connects and disconnects a resistance across the primary winding of the transformer in said sideband frequency signal path in order to provide a low and high impedance termination respectively.

10. An indicating arrangement as claimed in claim 9 wherein two levels of said switching device are associated with the transformer in the audio frequency signal path and serve to connect up a potentiometer so that a low and high impedance termination is obtained in two positions of said switching device while in other positions of said switching device the connections of the potentiometer enable the arrangement to be calibrated for operation between predetermined upper and lower limits.

TESEO BRUNO DANTE TERRONI.
JAMES ROWAN CANNON.

REFERENCES CITED

The following references are of record in the file of this patent:

UNITED STATES PATENTS

| Number | Name | Date |
|---|---|---|
| Re. 22,328 | Crosby | June 1, 1943 |
| 2,173,231 | Koch | Sept. 19, 1939 |
| 2,284,747 | Koch | June 2, 1942 |